May 28, 1968  A. T. CRANE  3,385,109
VACUUM OPERATED LIQUID LEVEL GAGE SENDING UNIT
Filed Jan. 3, 1967
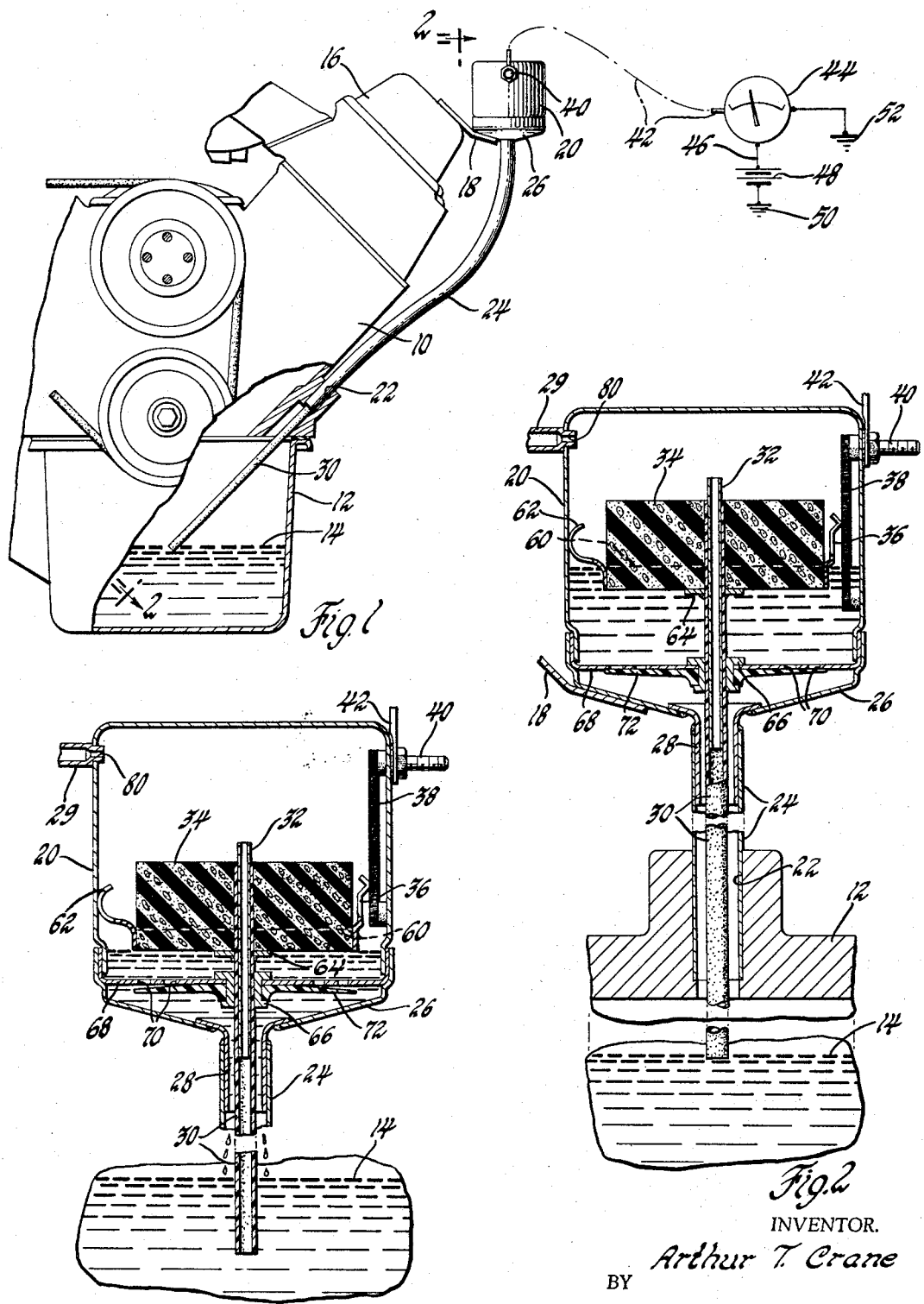
INVENTOR.
Arthur T. Crane
BY
George E. Johnson
ATTORNEY

3,385,109
VACUUM OPERATED LIQUID LEVEL GAGE SENDING UNIT

Arthur T. Crane, Burt, Mich., assignor to General Motors Corporation, Detroit, Mich., a corporation of Delaware
Filed Jan. 3, 1967, Ser. No. 606,714
8 Claims. (Cl. 73—313)

ABSTRACT OF THE DISCLOSURE

This invention relates to liquid level indicating devices and more particularly to a unit activated by the application of a vacuum to cause a float in the unit to impart a signal in accordance with a liquid level thereby to operate an electrical gage which may be remote from the liquid.

SUMMARY OF THE INVENTION

The sending unit herein disclosed comprises a signal sending unit mountable on an internal combustion engine in place of the conventional dipstick for measuring liquid or oil level in the crankcase. The position of a float in the unit upon application of a vacuum to the unit determines an electrical current signal transmittable to a conventional liquid level gage. The nature of the unit permits its installation in current automobile engines without modification of the latter.

DESCRIPTION OF THE INVENTION

In the drawings:

FIGURE 1 is a partial end view of an automobile engine with a portion of the crankcase broken away and a sending unit embodying the present invention as well as a liquid level gage arrangement being shown as associated with the engine;

FIGURE 2 is an enlarged sectional view looking in the direction of the arrows 2—2 in FIGURE 1 and showing parts as positioned during effective operation; and FIGURE 3 is a view similar to that of FIGURE 2 but showing the parts as positioned immediately after the engine has been stopped.

A portion of an engine 10 is shown as having a crankcase 12 with an oil level 14 as existent during car operation. Attached to the overhead valve cover 16 of the engine is a bracket 18 for supporting a tank 20 with the axis of the latter substantially vertical. The engine block is originally bored as at 22 for the reception of a conventional dipstick but in the present case a large inner diameter curved tube 24 constituting a part of the present invention is substituted in the bore for the dipstick. The lower end of the tube 24 is tightly held in the bore 22. Its upper end is attached to the cover 26 for the bottom of the tank 20 by an inner flared tube element 28, which acts as a rigid coupling. The tube 24 may be of oil resistant rigid or flexible plastic or of metal and for a V-8 engine it is convenient to make the tube curved as shown in FIGURE 1. In many engines, it is possible to have the tube 24 rigid and extend vertically.

A source of vacuum may be the engine intake manifold and a connection therefor to the tank 20 is shown at 29. The tank is otherwise closed except for the tube 24 and a smaller outside diameter tube 30. The tube 30 may be of one rigid piece if the tube 24 were made to be used in a vertical position but in the drawing it is flexible to a certain extent and includes a rigid upper portion 32 of metal. This portion is tightly held within the main part of the tube 30 to aid in guiding a float 34 for vertical travel within the tank 20. The portion 32 also maintains a contact element 36 in sliding relation with a coil resistance element 38 mounted in insulated relation to the casing 20. One end of the element 38 is provided with a terminal 40 which is adapted to be connected by a line 42 to an electrical gage 44 in turn connected by a line 46 to a battery 48 grounded at 50. One terminal of the gage 44 is grounded as at 52. The gage may be like that shown in the United States Patent 2,883,623, granted Apr. 21, 1959 in the names of H. R. Hastings and C. A. Haut. Any conventional instrument will serve to give an indication in accordance with the current signal imparted by the tank sending unit.

The contact element 36 includes a ring 60 encircling the float 34 and a spring member 62 contacting the tank wall opposite the resistance element 38. A disc 64 aids in fastening the float 34 rigidly to the tube 30. An annular guide member 66 is supported on a partition 68 forming an inner bottom of the tank 20. The partition is apertured as at 70 and these apertures are controlled by a one way valve 72 in the form of a vane structure which is flexible and which responds to pressure. The valve 72 is in the form of a circular disc with a hub retained between annular flanges integral with the guide member 66 and the disc is adapted to close or open the apertures 70.

The tube 30, particularly if placed loosely in a curved larger tube 24 as shown in FIGURE 1, is preferably made of polytetrafluoroethylene or polypropylene. Such a plastic material flexes and slides easily within the guide tube 24 and is resistant to oil and gasoline. A portion of the tube 30 extends downwardly from the bottom end of the guide tube 24 and must exhibit a degree of stiffness to retain a substantially stable position for its open end with relation to the liquid level 14 as will further appear.

When the car engine is started and vacuum is supplied at 29, the valve 72 will close the aperture 70 and oil will be drawn up the tube 30 and gather above the partition 68. The tube 30 is made of such length that it extends from the proper oil level (engine running) to a position of the float 34 which will give a "full" reading on the gage 44. Stabilization occurs after engine starting as soon as air in place of oil begins to enter the lower end of the tube 30 and this situation is depicted in FIGURE 2 during which the oil level 14 is below the full level. When the engine ceases to operate, the vacuum is lost and the valve 72 will open to begin to drain the tank 20 as seen in FIGURE 3.

The sending unit provides continuous monitoring of the oil level and it need dissipate very little engine vacuum with the use of a restrictive orifice 80 in the vacuum connection. Variations in engine speed have no appreciable effect on the performance of the sending unit as experience has shown that the oil level or crankcase quantity remains substantially constant (within ⅙ of a quart) from idle to 80 miles per hour in automobile use.

I claim:

1. A liquid level gage sending unit comprising a tank adapted to be mounted on a support such as an automotive engine, a float in said tank, a first tube of large inside diameter dependent from said tank and insertable in a liquid container such as an engine crankcase for connecting said tank to said container, a second small outside diameter tube within said first tube and having one open end fixed to said float, a resistance element and a contact element cooperatively mounted in said tank, one of said elements being fixed to said tank and the other to said float to move therewith, one of said elements being adapted to be grounded and the other being insulated from said tank and adapted to be connected to a power supply, a vacuum connection on said tank, one-way pressure actuated valve means positioned to control gravity flow of liquid from said tank through said first tube, and the said second tube being freely movable in said first tube simultaneously with movement of said float and having its other end open and extending from the said first tube.

2. A sending unit as set forth in claim 1, guide means retaining said second tube axially slidable in said tank and holding said elements in contact.

3. A sending unit as set forth in claim 1, said other element being the said resistance element, and the said grounded element being in sliding contact with said tank.

4. A sending unit as set forth in claim 1, guide means retaining said second tube axially slidable in said tank and including a rigid tube coaxial and slidable with said second tube.

5. A sending unit as set forth in claim 1, means for supporting said tank with axes of corresponding ends of said tubes substantially vertical, and said second tube being flexible but restrained against substantial transverse movement by said first tube.

6. A sending unit as set forth in claim 1, said second tube being relatively rigid at its upper portion and relatively flexible within said first tube.

7. A sending unit as set forth in claim 1, said first tube being curved and said second tube being relatively flexible within said first tube, and the material of said second tube being, at least in part, of oil resistant plastic.

8. A sending unit as set forth in claim 1, said valve means including a vane structure adapted to close when vacuum is applied to said tank and to open when air is admitted to said tank.

References Cited
UNITED STATES PATENTS

| | | | |
|---|---|---|---|
| 1,529,070 | 3/1925 | Lea | 73—306 |
| 1,751,016 | 3/1930 | O'Neill | 73—306 X |
| 2,926,526 | 3/1960 | Perkins | 73—313 |

DAVID SCHONBERG, *Primary Examiner.*

D. M. YASICH, *Assistant Examiner.*